United States Patent Office 3,266,922
Patented August 16, 1966

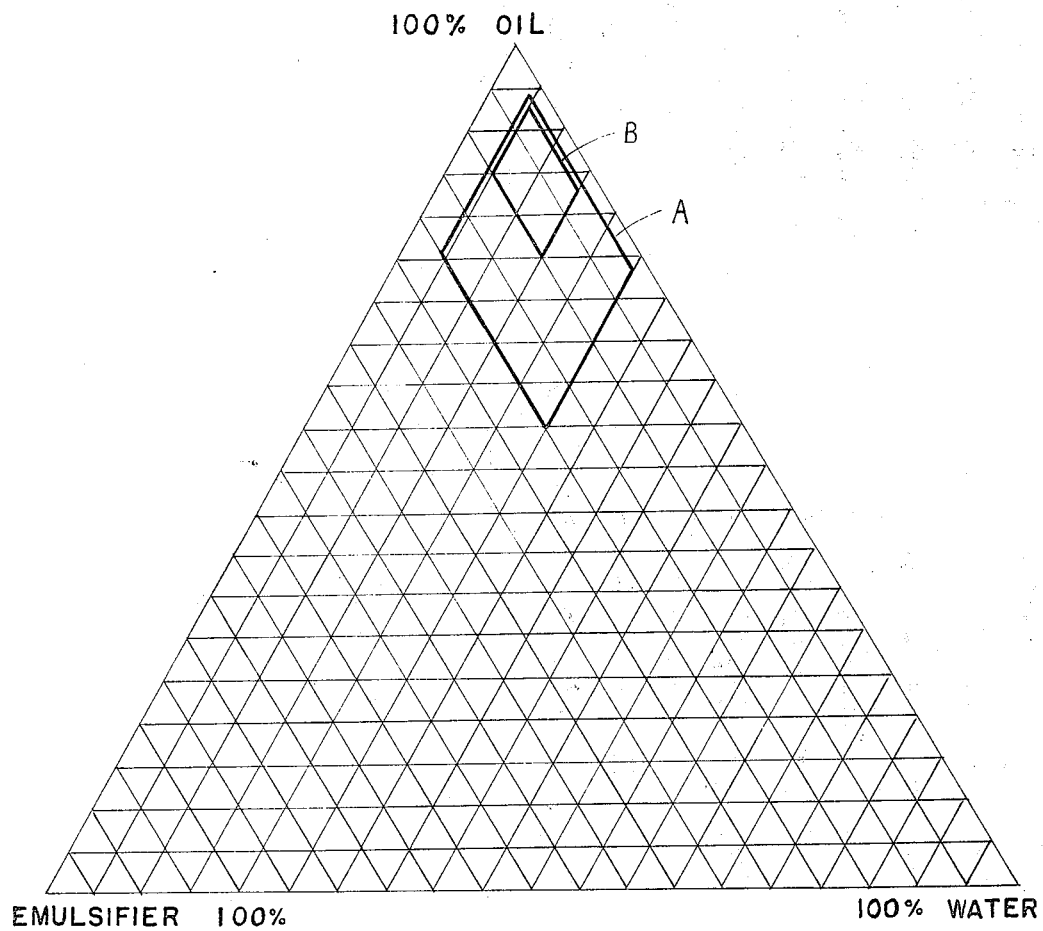

3,266,922
CONCENTRATED EMULSIONS OF
BODIED OIL IN WATER
Lowell O. Cummings, San Anselmo, and John A. Kneeland, Kentfield, Calif., assignors to Pacific Vegetable Oil Corporation World Trade Center, San Francisco, Calif., a corporation of California
Filed Feb. 19, 1965, Ser. No. 433,957
23 Claims. (Cl. 106—252)

This application is a continuation-in-part of application Serial No. 199,631, filed June 4, 1962, now abandoned.

This invention relates to improved oil-in-water emulsions and to an improved method of making them. More particularly, it relates to emulsions of bodied drying oils and alkyds thereof in water and to their preparation, the resultant emulsion having particular use in water-emulsion paints, though having other uses too.

The invention provides a novel paint vehicle. For years, all paints were made up of a drying oil (usually linseed oil), pigments, and solvent as a thinner. Then new paints were developed by converting the drying oils into alkyds, making faster drying and harder films. More recently came the so-called latex paints, products of various petroleum-derived polymers emulsified in water. Attempts have also been made to convert drying oils or drying-oil-based alkyds to a water-thinned vehicle by using ionic emulsifiers, usually a water-soluble salt.

The present invention represents a different approach: it employs a non-ionic emulsifier in conjunction with a fully bodied (heat-bodied or air blown) drying oil or alkyd thereof to produce a stable oil-in-water emulsion unaffected by changing pH, by volatile alkalis, and by the strong metal ions of pigments. It is characterized by drying very quickly—a half-hour usually being sufficient time between coats. It brushes easily and well and penetrates wood as only oils can. The vehicle can be quite concentrated, with typically 65% solids content *before* adding the pigment, and it can easily be diluted by simply adding water. It is freeze-thaw resistant and dries to a very hard, tough finish. Even thicker, as well as thinner, emulsions are obtainable, with oil contents between 9/15 and 14/15 of the emulsion.

In addition to this very important use in paints, the new emulsion of this invention can be used in sizing textiles, in making backings for rugs, in making linoleum, in filling and coating paper, and in other analogous applications.

We have found that for the emulsion to be suitable for use in paint and some of these other uses, it is important that the emulsion consist of small-sized bodied oil particles dispersed in the continuous water phase; the particles should all be less than 10 microns across, preferably less than 5 microns across and preferably averaging two microns across or less.

Such emulsions have, so far as we are aware, been unknown to the prior art. Bodied oils have been mixed into water with emulsifiers, but all prior procedures known to us resulted in relatively large sized particles, with average diameters above 10 microns and particles as large as 20 or even 50 microns across. These particles larger than 10 microns are not, we have found, satisfactory for the production of paint vehicles, because they have a strong tendency to "cream out," i.e., to deposit an oily layer on the surface, the larger particles in the emulsion tending to float to the top and to coalesce there. Once there has been such creaming out, special machinery would be required to re-emulsify the mixture.

The emulsion of the present invention does have substantially all its particles less than 10 microns across, generally less than 5 microns across, and the average particle size is typically one or two microns across. Such an oil-in-water emulsion is quite stable. It can sit on a shelf for months without creaming out and simple stirring or shaking places it immediately in a uniform condition suitable for painting.

Problems had to be solved before such an emulsion could be made. Ordinary emulsification processes did not give satisfactory results. Proposals such as those by Auer in U.S. Patents 2,382,533 and 2,418,452 called for special after-treatments, but were not stable and lacked the necessary particle size whether or not the special after-treatments were employed.

We have found two things critical in the making of suitable such oil-in-water emulsions: (1) the use of a two-stage process, in which a very thick mayonnaise-like initial stage is first made and then diluted and (2) the combination of high-shear agitation with continuous mixing during the initial stage.

As to the necessity of the two-stage process, we have found that attempts to make water-in-oil emulsions directly from heavy bodied oil, emulsifier, and water in excess of 25% of the total, are doomed. Such attempts produce either a water-in-oil emulsion or an emulsion having relatively large particles of the bodied oil, particles which lead to creaming out. We have found that if suitable bodied oil and a suitable amount of emulsifier are mixed initially with about 5% to about 25% water (under the shear-and-mix conditions described below) to produce a mayonnaise-like mixture having the size of the particles of bodied oil less than 10 microns and the average size about 2 microns or less, then that mayonnaise-like mixture can be subsequently diluted as much as one may wish or as little as one may wish to give a stable oil-in-water emulsion with the desired small sizes of bodied oil particles. This two-stage process may be practised either batch by batch or continuously.

As to the mixing of the bodied oil and emulsifier with about 5% to 25% water, we have found that most emulsifying equipment will not produce the desired particle sizes. Some machines employ high speed discs to set up a shearing action; others have anchor-type agitators with baffles turning at about 60 r.p.m.; still others are ultrasonic devices. So far, such equipment has not been able to give the desired results necessary to the practice of this invention. We have found that what is needed is a combination of high-shear beating with continuous recirculation or mixing. When this is done, as described below, the mayonnaise-like oil-in-water emulsion with low particle size is obtained.

Another critical factor is that of the overall viscosity of the bodied oil. We have found that when the viscosity is less than about $Z_1$ (Gardner-Holdt) or about 25 strokes, the desired emulsion cannot be obtained. It is, however, feasible, we have found, to blend $Z_8$ bodied oil with G viscosity bodied oil and to emulsify the mixture, so long as the proportions are such that the overall viscosity of the mixture is $Z_1$ or higher. The upper limit of viscosity is about $Z_{10}$.

The invention is confined to the use of bodied oils (and alkyds) having an overall viscosity of $Z_1$ to $Z_{10}$, whether blended or not, and to such oils (and alkyds) bodied from drying oil having an iodine value of at least 125.

We have found it very important to use a non-ionic emulsifier that is soluble in *both* the bodied oil (or alkyd) and water. If insoluble in either, or poorly soluble in either, poor results are obtained, and ionic types of emulsifiers exhibit poor stability in the presence of many pigments.

Other objects and advantages of the invention will become apparent from the following description of some preferred forms of the invention.

The drawing is a triangular graph showing the proportions of bodied oil, emulsifier, and water which can be used to make a mayonnaise-like first stage oil-in-water emulsion, according to the principles of this invention.

To practice the invention a drying oil or a blend of drying oils having an iodine value of at least 125 is bodied to a Gardner-Holdt viscosity of between $Z_1$ and $Z_{10}$, preferably to about $Z_8$. The oil may be bodied by heat or by being air blown. Or a blend of bodied oils of this type is made having a resultant viscosity between $Z_1$ and $Z_{10}$. This bodied drying oil is then emulsified in a small amount of water with the aid of a non-ionic emulsifier that is both water-soluble and oil-soluble, to produce an oil-in-water emulsion. This initial emulsion is a thick mayonnaise-like mixture having an average oil particle size between 0.1 and 5 microns, substantially all the particles being below 10 microns in size, and typically averaging about one or two microns. This mayonnaise-like mixture may be stored as long as desired for it is quite stable, or it may be diluted at once. When mayonnaise-like, it is too thick for use as a paint vehicle, but it is at any time readily diluted merely by adding water, and an oil-in-water emulsion is readily obtained in any desired proportion of oil to water and still having the same fine particle size as did the initial mayonnaise-like mixture. For paint vehicle, it is convenient to sell an emulsion that has about 65% solids and 35% water.

As will be seen, the present invention is contrary to the popular idea that the best way to make an oil-in-water emulsion is to add oil solwly to water under conditions of agitation. With the very viscous bodied oils used in this invention, we have found that one cannot obtain a vehicle of more than about 60% solids by this procedure and still have the necessary small particle size. Neither can one start with 65% solids and 35% water and achieve success in this type of product.

As stated earlier, we take the radical approach of preparing an oil-in-water emulsion in which the continuous (water) phase comprises only about 5% to 25% of the total. We have made satisfactory emulsions of this type with as little as 4.85%, which we consider as coming within the range of "about 5%."

The important water-and-oil solution non-ionic emulsifier is used in amounts from about 2% of the total (we have achieved satisfactory results at 1.85%, which we consider to be about 2%) to about 20% of the total.

Instead of a drying oil, an alkyd of a drying oil may be used; this can be defined as the reaction product of a drying oil having an iodine value of at least 125 with a polyhydric alcohol and a dibasic acid, the reaction product having or being bodied to have a viscosity of $Z_1$ to $Z_{10}$.

The drawing, a triangular graph, shows the ranges contemplated in this invention. Two curves are shown, one larger curve A for values that are possible and usable, with ranges of about 2% to 20% emulsifier, about 5% to 25% water, and about 55% to 93% oil, and a smaller-area curve B representing what we consider to be more practical considering both economics and available mixing machinery, with a range of about 2% to 10% emulsifier, about 5% to 15% water, and about 75% to 93% oil.

We have found that while most emulsifying mixers (including homogenizers) are unsatisfactory, we can get the necessary high-shear breakdown of the bodied oil and extend it throughout a large body of oil-water mix from a planetary-type mixer. Such mixers typically have one or two beater blades, each rotating swiftly about its axis while being revolved at a slower speed so as to wipe the periphery of a circular walled mixing vessel. Wiping the periphery at close clearances produces very high shear between the vessel and the blade, and the off-center mounting and revolution of the blades helps to mix in all the material in the vessel. Such mixers are sometimes used by bakers for mixing cake batters.

We have tested the emulsions produced by various mixers and methods and find that one can quite simply detect whether such an emulsion is water-in-oil or oil-in-water by testing its electrical resistance. With electrodes spaced 1½ inches apart, oil-in-water emulsions having average particle sizes between one and three microns had a resistance of 10 to 60 kilohms, while water-in-oil emulsions of similar chemical makeup had resistances in the range of 10 to 100 megohms—a thousand times and more as great. Moreover, the water-in-oil emulsions will not disperse in water, when added to water, while the oil-in-water emulsions of this invention disperse completely. Thus, it is essential that the mayonnaise-like initial-stage emulsion be an emulsion of oil in water.

The process is most conveniently run at room temperatures and at atmospheric pressure. Pressure seems to be immaterial, and temperatures up to about 130° F. can be used if desired. When the temperature gets too hot, say 250° F., the emulsion tends to form as a water-in-oil emulsion. Actual temperatures depend greatly on the proportions to be mixed and on the identity of the emulsifier and of the oil. Every oil has somewhat different conditions at the borderlines, i.e., curve A, but generally lie in the same basic range, i.e., within curve B. Too little emulsifier and too little water tend to produce water-in-oil emulsions, as do excessively high temperatures. As a practical matter, however, use of median or non-extreme amounts and room temperatures give universally good results.

The product resulting from this initial stage, having about 2% to 20% emulsifier, about 5% to 25% water, and about 55% to 93% bodied $Z_1$–$Z_{10}$ drying oil can be stored and kept as a stable product and diluted as desired for use. It is preferably stored in a container or otherwise kept from being subjected to evaporation of the water, and it is kept at room temperature or colder or somewhat warmer, but not hot.

The initial-stage product is opaque, whitish (when made from bodied very light-colored oil such as safflower oil), has a shiny surface and plastic flow. It holds almost any shape it has been formed in. If an object is drawn over its surface, a track will be left, and the track will not flow back to give a smooth surface, even though the force needed to make the track is small. It does not yield or change shape until a certain small critical amount of force is reached, and then it yields more or less as if it were a Newtonian liquid. The force of gravity is not enough to cause flow, yet it is easily deformed.

In many instances we find it better to dilute the initial-stage product at one, for better handling. A convenient product is obtained at a water level of about 35%, where the product will flow. Dilution is a simple matter, for if the mayonnaise-like material is placed in water, it will disperse itself throughout the water to make a dilute emulsion of fine oil droplets.

However, it is often desirable to manufacture the 65% solids vehicle on a continuous basis, and this is readily done. By making an initial batch of the mayonnaise-like material and then feeding the ingredients to the top of the mixing vessel while withdrawing the finished initial-stage material from the bottom, since it will flow under the weight of material above it, the initial stage may be made continuous. Then the withdrawn material can be mixed with more water. For example, the initial stage material can be emptied from the emulsifying mixer into a container and circulated with water through a mixing pump. The mixture may be recirculated while continuously adding water and the mayonnaise-like material, taking off a product suitably mixed. Continuous production is thus readily achieved and is one of the great gains of the present invention.

The approximately 65% solids and 35% water mix is a flowable emulsion which remains stable and can itself be easily diluted. In addition to the water, bodied $Z_1$ to $Z_{10}$ drying oil and the non-ionic water-and-oil soluble emulsifier, it may contain formaldehyde or other fungicide for mold control and an alkylene glycol or other anti-freeze. Hydroxyethyl cellulose or other alkyl celluloses may be used too, where desired, though they are not necessary.

The following examples help to explain the invention.

EXAMPLE 1

*Initial mayonnaise-like mixture*

| Component | Parts by Weight | Percent |
|---|---|---|
| Heat-bodied safflower oil, Gardner-Holdt viscosity $Z_8$ | 32 | 87 |
| Non-ionic emulsifier (nonyl phenyl polyethylene glycol ether containing 10.5 moles of ethylene oxide) | 1.75 | 5 |
| Water | 3 | 8 |
| Totals | 36.75 | 100 |

In different instances the ingredients have been fed in together as a batch, fed continuously, fed separately, fed mixed, or fed with the oil separate from the water and with the emulsifier dissolved in the oil. The mix at high shear and continuous mixing is best done by a planetary beater and takes only a few minutes. It can be continuous at a typical rate of about 30 gallons per hour in a typical such mixer with 20 gallon capacity vessel.

The resultant mayonnaise-like or grease-like mixture may then be stored in a closed container or diluted at once or at any desired time. It is an oil-in-water emulsion with an average particle size of about one micron.

EXAMPLE 2

A typical diluted mixture may be made from the product of Example 1 as follows:

| Component: | Parts by weight |
|---|---|
| Product of Example 1 | 36.75 |
| Additional water | 13.8 |
| Total | 50.55 |

This diluted thick flowable oil-in-water emulsion has the same average oil particle size of about one micron. It is stable and may be stored indefinitely. It has a water content of about 33% and a solids content of about 67%. It is useful as a paint vehicle, as will be shown later.

EXAMPLE 3

The product of Example 2 may have fungicide added to prevent mold formation and anti-freeze added to enhance the freeze-thaw resistance of the emulsion.

| Component: | Parts by weight |
|---|---|
| Product of Example 2 | 50.55 |
| Formaldehyde | 0.35 |
| Ethylene glycol | 0.91 |
| Total | 51.81 |

The oil particle size is the same as in Example 2, and the characteristics are the same except for mold control and better resistance to freezing and thawing. Propylene glycol may be substituted for ethylene glycol in equal amounts.

TABLE I

*Properties of the emulsion of Example 3*

| | |
|---|---|
| Appearance | Creamy-white fluid. |
| pH | 6 to 7. |
| Viscosity—25° C.: | |
|   Centipoises | 100–300. |
|   Kreb units | 50–60. |
| Non-volatile content | 65% ±1%. |
| Pounds per gallon: | |
|   As emulsion | 8.0 to 8.1. |
|   As solids | 7.9 to 8.0. |
| Average particle size, microns | 1.5. |
| Freeze-thaw resistance | Passes five 24-hour cycles, 0° F. to 75° F. |

EXAMPLE 4

In place of the safflower oil used in Examples 1 to 3 heat-bodied linseed oil with a viscosity of $Z_9$ has been used with similar results, and heat-bodied walnut oil (acid value 5.9, color Gardner 7, and Gardner-Holdt viscosity of $Z_8$ plus) has also been used with similar results. Other oils used include (a) safflower oil heat-bodied to $Z_4$ viscosity and then air-blown to $Z_8$ viscosity, both with and without a cobalt catalyst; (b) safflower oil heat-bodied to $Z_{7\ 1/2}$ viscosity with an acid number of about 24; (c) safflower oil alcoholized with a small amount of pentaerythritol and mixed with maleic anhydride to make an alkyd and heat-bodied to $Z_3$ viscosity and air-blown to $Z_8$ viscosity; (d) a blend of 40% safflower oil, 30% walnut oil, and 30% soya oil, bodied to $Z_8$ viscosity (acid value 6.2, color Gardner 5+); (e) a blend of 40% safflower oil, 30% walnut oil, and 30% fish oil, bodied to $Z_{8\ 1/2}$ (acid value 7.7, color Gardner 9); and (f) a very long oil isophthalic safflower alkyd was made by alcoholizing 900 parts of safflower oil with 38 parts of pentaerythritol at 470° F., adding 79 parts of isophthalic acid and heating at 550° F. to reach a $Z_3$ viscosity; this alkyd was then air-blown at 300–330° F. until a $Z_8$ viscosity was reached. Bodied soya oil, and bodied fish oil may also be used alone, if desired, though the oil is not so light in color.

Since the emulsion can be supplied at 65% solids content, the highest solids content of any latex or emulsion presently offered for use in house paints, the paint manufacturer obtains sizable freight savings and is able to formulate paints with higher solids contents. If desired, solids content up to about 95% may be obtained by leaving the material in its mayonnaise-like state.

The vehicle blends readily with most synthetic latexes to make stable mixtures. No adjustment in pH appears necessary for this stability. The films of these mixtures show various degrees of transparency, depending on the type of resin and the amount of the emulsion in the film. However, lack of transparency does not indicate poor film characteristics. Such combinations of the emulsion with various latexes make possible house paints which have the toughness of synthetic latexes combined with the adhesion, non-yellowing, air-drying of the emulsion. Moreover, improved coalescence of latex paints can be expected with the addition of the emulsion, because vegetable oils, even at high viscosity, flow until air drying takes place.

EXAMPLE 5

One good non-ionic emulsifier has been given in Example 1. In general the invention is restricted to emulsifiers that are: (1) non-ionic, (2) soluble in oil, and (3) soluble in water. Non-ionic emulsifiers which are insoluble or poorly soluble in either water or oil do not give satisfactory results. This fact is illustrated in the following table, in which emulsions were prepared from 1000 grams each of vegetable oil bodied to a viscosity of 600 stokes (Gardner-Holdt viscosity of about $Z_8$) and 50 grams of each of the various emulsifiers shown below.

The mixing was done in a planetary mixer at room temperature. Then an amount of 100 grams of water was added slowly and the mixer was run at high speed for about five minutes. This, when successful, formed a thick mayonnaise-like oil-in-water emulsion, which was then diluted with 465 grams of water at room temperature. The particle sizes of the oil droplets in the emulsion were noted by observation through a microscope fitted with a measuring scale.

is added for mold control. Equal quantities of propylene glycol may be substituted for the ethylene glycol, which is used primarily to enhance the freeze-thaw resistance of the emulsion. This emulsion has an average particle size of 1 to 1.5 microns, and a solids content of 65%. Paint made with this emulsion had better adherence to chalky surfaces than did paints made from an emulsion of the $Z_8$ oil alone. (The net viscosity of the oil blend alone was about $Z_6$.)

TABLE II
*Effects of solubilities in oil and water of non-ionic emulsifiers*

| Emulsifier | Solubility in oil | Solubility in water | Approximate particle size | Quality rating [1] |
|---|---|---|---|---|
| Pluronic L-44 [2] | Good, but slightly cloudy. | Good | 70-80% 2 microns and under. | 8 |
| Pluronic L-61 [2] | Very good, clear | Poor, cloudy | | 0 |
| Pluronic L-64 [2] | Good, very slightly couldy. | Good | 90% 2 microns and under. | 10 |
| Pluronic F-68 [2] | Poor | do | | 0 |
| Pluronic P-84 [2] | Fair, slightly hazy. | Poor | 40% 4 microns or larger. | 4 |
| Tergitol NPX [3] | Excellent, clear | Good, clear | 90% 2 microns or under. | 10 |
| Igepal CTA 639 [4] | Good, very slightly cloudy. | Good | 90% of particles 2 microns or under. | 10 |

[1] The ratings vary from "0," indicating complete lack of formation of an oil-in-water emulsion, to "10," indicating formation of a top-quality oil-in-water emulsion.
[2] The Pluronic emulsifiers used were all block polymers of propylene oxide with ethylene oxide added at both ends of the propylene oxide molecule. The propylene oxide polymer portion of the molecule is substantially water-insoluble, while the ethylene oxide polymer portion is essentially water-soluble. The differences between the various Pluronic emulsifiers of Table II are as follows:

| Pluronic | Molecular weight of propylene oxide polymer | Percent polyoxyethylene |
|---|---|---|
| L-44 | 1,000-1,200 | 40 |
| L-61 | 1,500-1,800 | 10 |
| L-64 | 1,500-1,800 | 40 |
| F-68 | 1,500-1,800 | 80 |
| P-84 | 2,100-2,500 | 40 |

[3] Tergitol NPX is nonyl phenyl polyethylene glycol ether containing 10.5 moles of ethylene oxide.
[4] Igepal CTA 639 is alkaryl poly (ethyleneoxy) ethanol.

EXAMPLE 6

| Components: | Parts by weight |
|---|---|
| Heat-bodied safflower oil, Gardner-Holdt viscosity $Z_8$ | 22.4 |
| Heat-bodied safflower oil, Gardner-Holdt viscosity G | 9.6 |
| Non-ionic emulsifier as in Example 1 | 1.75 |
| Water (total of both stages) | 16.80 |
| Ethylene glycol | 0.91 |
| Formaldehyde | 0.35 |
| Totals | 51.81 |

The emulsion was made in two stages using about five parts of the water in the first stage. The formaldehyde

TABLE III
*Properties of the emulsion of Example 6*

| | |
|---|---|
| Appearance | Creamy-white fluid. |
| pH | 6 to 7. |
| Viscosity—25° C.: | |
| Centipoises | 100–300. |
| Kreb units | 50–60. |
| Non-volatile content | 65%. |
| Pounds per gallon: | |
| As emulsion | 8.0 to 8.1. |
| As solids | 7.9 to 8.0. |
| Average particle size, microns | 1.5. |
| Freeze-thaw resistance | Passes five 24-hour cycles, 0° F. to 75° F. |

EXAMPLE 7

Among the tests made to determine the practical limits of viscosity of the bodied oil used in this process, various mixtures were made of $Z_8$ bodied safflower oil (600 stokes) and G viscosity oil (1.8 stokes), including the following:

TABLE IV

| Run | a | b | c | d | e | f |
|---|---|---|---|---|---|---|
| Percent Safflower $Z_8$ body | 100 | 70 | 50 | 40 | 30 | 0. |
| Percent Safflower G body | 0 | 30 | 50 | 60 | 70 | 100. |
| Viscosity of run, stokes | 600 | 195 | 76 | 34 | 14 | 1.8. |
| Viscosity of run, Gardner-Holdt | $Z_8+$ | $Z_6+$ | $Z_4+$ | $Z_{1\ 1/2}$ | X | G. |
| Particle size of emulsion: | | | | | | |
| Maximum, microns | 2-3 | 4 | 4 | 4 | Oil | Continuous. |
| Average, microns | 1-2 | 2 | 2 | 2 | Oil | Continuous. |

The emulsion was made in each instance from 1000 g. of the oil blend, 100 g. of water, and 50 g. of non-ionic emulsifier. The mix was a first-stage (mayonnaise-like) material and was made at 20° to 25° C. in a planetary beater-mixer. Good results were obtained in runs a through d, but the emulsions in runs e and f were unsatisfactory, being water-in-oil types.

EXAMPLE 8

Other oils and oil blends of $Z_8$ viscosity were made into oil-in-water emulsions by the two-stage process of this invention. In each of the instances of this example the following proportions were used to prepare the mayonnaise-like first stage oil-in-water emulsion:

| Component | Parts by Weight | Percent |
|---|---|---|
| $Z_8$ bodied oil, as indicated below | 956 | 90 |
| Non-ionic emulsifier, as in Example 1 | 34 | 3 |
| Water | 70 | 7 |
| Totals | 1,060 | 100 |

The mayonnaise-like material that resulted was diluted with 475 parts by weight of water, so that the water was about 35½% of the total, and the solids were about 64½%.

The oils used in this example, all bodied to about $Z_8$ viscosity, and the emulsion particle sizes were as follows:

TABLE V

Oil:                                               Particle size, microns
    Blend: 40% safflower, 30% soy, 30% walnut ___ 3
    Walnut _____ 2
    Linseed _____ 2
    Blend: 40% safflower, 30% walnut, 30% fish ____ 3

EXAMPLE 9

An attempt was made to make a 65% solids emulsion without first going through the "mayonnaise" stage.

| Components | Parts by Weight | Percent of Total |
|---|---|---|
| Safflower oil bodies to $Z_8$ | 500 | 61.5 |
| Non-ionic emulsifier of Example 1 | 28 | 3.5 |
| Water | 284 | 35.0 |
| Totals | 812 | 100.0 |

At high speed mixing at 22° C. as in Example 1, a water-in-oil emulsion was formed; after stirring was continued a few minutes, it changed to an oil-in-water emulsion, but some particles were as large as 50 microns, and the average size was 15 microns. It "creamed out" on further standing and was not suitable for use in paint.

EXAMPLE 10

Into a hemispherical vessel of a planetary-beater type mixer was charged 32 pounds of $Z_8$ bodied safflower oil, 1.1 pounds of the non-ionic emulsifier of Example 1, and 2 pounds of water. After a few moments of beating, a white-yellow mayonnaise-like oil-in-water emulsion was formed. Then a stream of $Z_8$ oil and a stream of water containing the same emulsifier were added during beating.

The viscous oil wrapped around the shank of the beater and was then thrown off into the vessel in a fine stream at the top. The introduced oil and water, at the rate of 60 pounds of oil per hour, 2 pounds of emulsifier per hour, and 3.75 pounds of water per hour, were observed to emulsify into the main mass of emulsion without difficulty, leaving no trace of visible oil particles. A valve at the bottom of the vessel was opened, and the water-in-oil emulsion discharged steadily at the feed-in rate.

The thick mayonnaise-like emulsion discharged from the vessel was stirred into water by hand to produce an oil-in-water emulsion of about 35% water and about 65% solids. The oil particle sizes were observed to be one micron and under in diameter.

EXAMPLE 11

Using as an initial charge some of the first-stage product of Example 10, a mixture of two bodied safflower oils was fed in continuously, half being of $Z_{8\ 3/4}$ viscosity and half of $Z_{7\ 1/4}$ viscosity. In 75 minutes, 115 pounds of this blend were introduced along with 7 pounds of water containing 4 pounds of the emulsifier of Example 1, and withdrawal was done at the same rate. The maximum particle size was one micron.

EXAMPLE 12

To a charge like that of Example 11, one stream like the blended oil stream of Example 11 was added, while another stream containing safflower oil bodied to G viscosity was put in simultaneously, and both oil streams were mixed with water and emulsifier. The parts were as follows:

Components:                             Parts by weight
    Safflower oil bodied to $Z_{7\ 1/4}$ _____ 50
    Safflower oil bodied to $Z_{8\ 3/4}$ _____ 50
    Safflower oil bodied to G _____ 43
    Non-ionic emulsifier of Example 1 _____ 5
    Water _____ 9
      Total _____ 157

A throughput of about 30 gallons per hour was obtained, slowed down in this instance by slow addition of the heavy oil blend. Using a pump and recirculation system, the mayonnaise-like emulsion was diluted to give 65% solids content. The particle size of the emulsion was two microns and under, mostly one micron or less.

EXAMPLE 13

Water base paints containing both titanium dioxide and zinc oxide tend to increase in viscosity and tend to coagulate. The same is true to a lesser extent when both titanium dioxide and calcium pigments are used. To prevent this viscosity buildup and to prevent the tendency to coagulate, approximately equal amounts may be added, to emulsions containing these pigment combinations, of each of the following ingredients, to an amount comprising about 3% of the emulsion:

(a) alkaline salts of carboxylated polyelectrolyte (for example, sodium or potassium salt of polyacrylic or polymethacrylic)

(b) alkaline polyphosphates (for example sodium or potassium polyphosphate and sodium or potassium tripolyphosphate).

EXAMPLE 14

A paint containing zinc and calcium was made with stabilizers (a) and (b) in the proportions shown below:

| Component: | Parts by weight |
|---|---|
| Emulsion of Example 6 | 390 |
| Additional water | 180 |
| Sodium polyacrylate | 16 |
| Potassium tripolyphosphate | 8 |
| Zinc oxide | 125 |
| Calcium carbonate | 110 |
| Titanium dioxide, rutile | 150 |
| Diatomaceous silica | 40 |
| Defoaming agent | 3 |
| Water-dispersible drier, 24% lead | 9.2 |
| Water-dispersible drier, 6% cobalt | 2.2 |
| Water-dispersible drier, 6% manganese | 2.2 |
| 3% hydroxyethyl cellulose in water | 95 |
| Totals parts | 1130.6 |

The resultant mixture was subjected to a heat stability test by holding it at 130° F. for 90 days, with results indicative of can or shelf stability over a long period of time.

The emulsion shows excellent stability to zinc oxide in both manufacture and storage. Paints made from it and with high levels of zinc oxide have shown negligible change of viscosity and pH in 17 months' storage. The inclusion of these ingredients combines zinc complexing action with the inherent stability of the emulsion and appears to give an excellent shelf life to the paints. Moreover, paints of this emulsion containing zinc oxide as one of the pigments have shown no mildew problems on various exposures. The zinc oxide also appears to aid in enhancing the good tint retention of these paints.

In contrast to some other emulsion house paint systems, paints made from this emulsion have proven to be very stable in the presence of calcium carbonate extender pigments. Calcium carbonate is acknowledged the desirable extender in tint base paints as it adds good tint retention properties. Thus in tint base paints of this invention the combination of the oil emulsion advantages and the additional advantages of calcium carbonate based pigments are found.

EXAMPLE 15

Exposure studies on tint paints have compared talc extended and calcium carbonate extended tint base paints using both the conventional oil-solvent system and the emulsion vehicle system of this invention. The talc extended paints in both vehicle systems tend to show earlier fading and also develop an uneven mottled color pattern. The calcium carbonate based paints showed a more durable color and no mottling. On the other hand, white paints remain white and clean longer with talc as the major extender pigment. In addition, various pigments can be used with the vehicle of this invention.

EXAMPLE 16

In contrast to the yellowing of conventional oil paints, paints based on this emulsion, if made from bodied safflower or walnut oil or blends of them with soya oil, are whiter and remain whiter in all exposures, including areas of low light intensities. Tests with a photovolt reflection meter (using a standardized blue filter) have proven that such paints made with those oil emulsions of this invention are whiter than other paints. In one such test, one linseed-water paint registered 79% reflective; another linseed water paint registered 76% reflectivity; and paint of this invention made from bodied safflower oil registered 83% reflectivity. The instrument reading on the white standard of the National Bureau of Standards was also 83%. Standard linseed paint in the same test registered only 72%. The non-yellowing paint of this invention starts whiter and stays whiter than other formulations.

EXAMPLE 17

The oil emulsion paints of this invention are inherently blister resistant due to the film structure that allows water vapor to be transmitted but is a barrier to liquid water. A stainless steel tank, containing several inches of water maintained at 180° F., was covered with wood test panels coated on top with primer topcoat system, Federal Specification TT–P–25a (August 2, 1961). Under these conditions, conventional oil paint blistered in only one day, acrylic emulsion paint blistered in only two days, but an emulsion paint of this invention resisted blistering for four days.

EXAMPLE 18

The adhesion over chalky surfaces of house paints employing the emulsion of this invention is excellent. Both tint base and white paints of this invention coated over a natural weathered conventional house paint with an ASTM chalk rating of 4. Similar panels were topcoated with conventional acrylic, polyvinyl acetate and conventional oil based exterior house paints. After drying periods of one week and one month, tape tests showed the following percentages of film removed by the tape:

TABLE VI

*Percentages of film of various paints removed by tape test*

|  | Paint Removed | |
|---|---|---|
|  | 1 week, percent | 1 month, percent |
| White emulsion paint of this invention | 5 | 2 |
| Tint based emulsion paint of this invention | 0 | 0 |
| Acrylic house paint | 95 | 95 |
| Polyvinyl acetate house paint | 40 | 30 |
| Conventional oil house paint | 0 | 0 |

A similar test was run on wood panels of three year exposed paints according to Federal Specification TT–P–102 (July 31, 1953). The panels, which had a chalk rating of 3 to 4, were coated with the paints as shown in Table VII and the panels were exposed outdoors in the test periods.

TABLE VII

*Percentage of film of various paints removed by tape test*

|  | Paint Removed by Tape | |
|---|---|---|
|  | 1 week, percent | 1 month, percent |
| Tint base emulsion paint of this invention | 0 | 0 |
| Proprietary acrylic emulsion paint | 95 | 95 |
| Proprietary linseed-solvent paint | 0 | 0 |

EXAMPLE 19

Ease of application is one of the outstanding properties of water based paints. Emulsion paints of this invention brush or roll on with remarkable ease at the same time applying a high-build, high-hide film. These paints approximate the hiding power and film thickness of conventional oil house paints.

When the water evaporates from the emulsion paint of this invention (in 30 to 60 minutes) a firm, recoatable film is formed. Another coat of oil-in-water emulsion paint can then be applied without lifting or balling the film, and the topcoat is applied with the same ease as the previous coat. The brushes and rollers are easily cleaned with soap and water. Air drying starts in the film immediately and continues until in a week's time a tough, hard through-dry film is formed.

The paint is not glossy but has a pleasing velvety uniform sheen and a rich "oil paint" feel. This uniform sheen reduces the visibility of lap marks. In test houses "do-it-yourselfers" encountered no lapping problems with paints of this invention and were amazed at the ease of application.

The inherent stability of the emulsion of this invention eliminates to a large degree many of the undesirable manufacturing problems generally encountered. There is no requirement for post stabilizers, volatile alkalies, buffering agents, coalescing aids or other costly additives, thus eliminating the odor and handling problems in the paint. Consequently, paints can be made from this emulsion in the normal manufacturing equipment available in most paint plants.

A three step process insures maximum dispersion of the pigment and minimum foaming. The formulas shown in the following five examples are best suited for high speed circular blade mills, high speed stone mill or stone ball mills. For roller mill grind some of the water should be withheld during the grind and added to the let-down. The three-step process is:

Step 1.—Mix in the order listed: water, the pigment stabilizers, and half of the defoamer, then stir in the pigments in the order given in each example. When the pigments have been added, slow stirring will release most of the air carried in by the pigments.

Step 2.—Grind the pigment water paste in a mill to a 3 to 4 grind, taking care not to entrain air.

Step 3.—Add the second half of defoamer, let down with the emulsion and driers and finally stir in the 3% hydroxyethyl cellulose solution until smooth.

EXAMPLE 20

A white paint of high zinc oxide content may be made as follows, with the following properties:

| Component: | Parts by weight |
|---|---|
| Water | 185. |
| Nonyl phenoxy poly (ethyleneoxy) ethanol | 1.5 |
| Potassium tripolyphosphate | 8. |
| Sodium salt of polyacrylic acid | 16. |
| Zinc oxide | 125. |
| Titanium dioxide, anatase | 50. |
| Titanium dioxide, rutile | 225. |
| Magnesium silicate | 75. |
| Defoamer | 3. |
| Emulsion of Example 6 | 390. |
| Water-dispersible drier, 25% lead | 9.2 |
| Water-dispersible drier, 6% cobalt | 2.2 |
| Water-dispersible drier, 6% manganese | 2.2 |
| 3% water solution of hydroxyethyl cellulose | 95. |
| Total parts by weight | 1087.1 |

Properties:

| | |
|---|---|
| Viscosity (Krebs units) | 70–80 |
| pH | 8.5–9.5 |
| Pigment volume concentration | 30% |
| Solids by weight | 64% |

EXAMPLE 21

A tint base of 32% pigment volume concentration may be made as follows with the following properties:

| Component: | Parts by weight |
|---|---|
| Water | 145. |
| Nonyl phenoxy poly (ethyleneoxy) ethanol | 1.5 |
| Potassium tripolyphosphate | 8. |
| Sodium salt of polyacrylic acid | 16. |
| Zinc oxide | 125. |
| Titanium dioxide, rutile | 150. |
| Calcium carbonate | 110. |
| Diatomaceous silica | 40. |
| Defoamer | 3. |
| Emulsion of Example 6 | 195. |
| Polyvinyl acetate copolymer emulsion, 55% solids | 230. |
| Water-dispersible drier, 24% lead | 9.2 |
| Water-dispersible drier, 6% cobalt | 2.2 |
| Water-dispersible drier, 6% manganese | 2.2 |
| 3% water solution of hydroxyethyl cellulose | 95. |
| Total parts by weight | 1132.1 |

Properties:

| | |
|---|---|
| Viscosity (Krebs units) | 70–80 |
| pH | 8.5–9.5 |
| Pigment volume concentration | 32% |
| Solids by weight | 63% |

EXAMPLE 22

A deep tone paint may be made as follows with the following properties:

| Component: | Parts by weight, lbs. |
|---|---|
| Water | 215. |
| Nonyl phenoxypoly (ethyleneoxy) ethanol | 1.5 |
| Potassium tripolyphosphate | 8. |
| Sodium salt of polyacrylic acid | 16. |
| Zinc oxide | 100. |
| Iron oxide, red | 120. |
| Calcium carbonate | 200. |
| Defoamer | 3. |
| Emulsion of Example 6 | 390. |
| Water-dispersible drier, 24% lead | 9.2 |
| Water-dispersible drier, 6% cobalt | 2.2 |
| Water-dispersible drier, 6% manganese | 2.2 |
| 3% water solution of hydroxyethyl cellulose | 95. |
| Total parts by weight | 1162.1 |

Properties:

| | |
|---|---|
| Viscosity (Krebs units) | 70–80 |
| pH | 8.5–9.5 |
| Pigment volume concentration | 31% |
| Solids by weight | 62% |

EXAMPLE 23

The following mixture made a very satisfactory redwood-colored stain for wood:

| Component: | Parts by weight |
|---|---|
| 1st Stage | |
| Water | 200 |
| Sodium polymethacrylate | 2 |
| Synthetic red iron oxide | 25 |
| Brown iron oxide | 25 |
| 3% water solution of hydroxyethyl cellulose | 100 |
| Subtotal for 1st stage | 352 |

(The first stage is then thoroughly dispersed)

2nd Stage

| | |
|---|---|
| The dispersal of Stage 1 | 352. |
| Water | 420. |
| Emulsion of Example 6 | 100. |
| Nonyl phenoxy poly (ethyleneoxy) ethanol | 4. |
| Water-dispersible drier, 24% lead | 2.3 |
| Water-dispersible drier, 6% cobalt | 0.8 |
| Total | 879.1 |

Properties:

| | |
|---|---|
| Pigment volume concentration | 13.8% |
| Viscosity (Krebs units) | 54. |
| Pounds per gallon | 8.7 |

This brushed easily on a plywood board, covering the board with a semi-transparent reddish coating. It dried overnight to a film that showed only a slight color ruboff, and after 48 hours it was completely dry.

What is claimed is:

1. An oil-in-water emulsion consisting essentially of
about 75% to 93% of a material chosen from the group consisting of bodied oils and alkyds having a Gardner-Holdt viscosity of $Z_1$ to $Z_{10}$ made from drying oil with an iodine value of at least 125,
about 2% to 10% of a non-ionic emulsifier, soluble in both water and said bodied oil,
and about 5% to 15% of water, the particle size of the oil particles lying between one-tenth micron and ten microns and averaging no more than three microns.

2. The emulsion of claim 1 wherein the oil is bodied linseed oil.

3. The emulsion of claim 1 wherein the oil is bodied walnut oil.

4. The emulsion of claim 1 wherein the oil is a bodied blend of safflower, walnut, and soya oils.

5. The emulsion of claim 1 wherein the emulsifier is nonyl phenyl polyethylene glycol ether containing 10.5 moles of ethylene oxide.

6. The emulsion of claim 1 wherein the emulsifier is alkaryl poly (ethyleneoxy) ethanol.

7. The emulsion of claim 1 wherein the emulsifier is a block polymer of propylene oxide with ethylene oxide at the ends thereof, of the type soluble in both oil and water.

8. The emulsion of claim 1 rendered stable in the presence of zinc and calcium ions by incorporating in addition
(a) an alkaline salt of carboxylated poly-electrolyte, chosen from the group consisting of the sodium and potassium salts of polyacrylic and polymethacrylic acids, and
(b) an alkaline polyphosphate chosen from the group consisting of sodium and potassium, polyphosphates and tripolyphosphates.

9. A paint based on the oil-in-water emulsion of claim 8, having additional water and also pigment, driers, and a thickener.

10. The paint of claim 9, containing a substantial amount of zinc oxide as part of the pigment.

11. The paint of claim 9, containing a substantial amount of calcium carbonate as part of the pigment.

12. An oil-in-water emulsion consisting essentially of about 75% to 93% bodied safflower oil of Gardner-Holdt viscosity between $Z_1$ and $Z_{10}$, about 2% to 10% non-ionic emulsifier of a type soluble in both said safflower oil and in water, and about 5% to 15% water having an oil particle size averaging below three microns, said emulsion resembling mayonnaise in physical appearance and being freely dilutable in water.

13. The emulsion of claim 12 wherein the safflower oil is a blend of G viscosity oil with $Z_8$ viscosity oil.

14. A method of making an oil-in-water emulsion comprising
adding together the ingredients consisting essentially of
(a) a bodied material chosen from the drying oils and their alkyds having a viscosity of $Z_1$ to $Z_{10}$ and made from drying oil with an iodine value of at least 125,
(b) water, and
(c) a non-ionic emulsifier soluble in each of the oil and the water,
said oil comprising about 75% to 93% by weight of the total, said emulsifier comprising about 2% to 10% by weight of the total and, water about 5% to 15% by weight thereof, and
forming an emulsion with water as the continuous phase and with said oil having a particle size averaging no more than three microns and in a range from one-tenth micron to ten microns, by mixing said ingredients at high shear.

15. A method of making a high-solids content oil-in-water emulsion suitable for use in paints, comprising
diluting the oil-in-water emulsion obtained from the method of claim 14 with water to reduce the oil content to about 60% and to raise the water content to about 35%, and mixing the diluted mixture well.

16. A method of making a paint vehicle comprising the steps of
(1) adding together ingredients consisting essentially of
(a) a bodied oil having a Gardner-Holdt viscosity of $Z_1$ to $Z_{10}$ bodied from drying oil with an iodine value of at least 125,
(b) water, and
(c) a non-ionic emulsifier soluble in each of the oil and the water,
said oil comprising about 75% to 93% by weight of the total,
said emulsifier comprising about 2% to 10% by weight of the total and, water about 5% to 15% by weight thereof,
(2) forming an oil-in-water emulsion with water as the continuous phase and said oil in particles averaging no more than three microns across and in a range from one-tenth micron to ten microns, by mixing at very high shear and
(3) diluting the resultant oil-in-water emulsion with water to reduce the oil content to a suitable level for paints and to thin the emulsion to desired flow characteristics, and mixing the diluted mixture well.

17. A method of making a safflower oil-in-water emulsion suitable upon dilution for use in paints and the like, comprising the steps of
adding together ingredients consisting essentially of:
(a) about 75% to 93% by weight of safflower oil bodied to a viscosity of between $Z_1$ and $Z_{10}$,
(b) about 2% to 10% of non-ionic emulsifier soluble in said oil and in water, and
(c) about 5% to 15% of water and
forming an oil-in-water emulsion having an average oil particle size less than two microns by mixing said ingredients at about room temperature and at very high shear.

18. The method of claim 17 wherein said bodied safflower oil comprises a blend of G viscosity oil with $Z_8$ viscosity oil.

19. A method of making a safflower oil-water emulsion suitable for use in paints and the like, comprising the steps of
(1) adding together ingredients consisting essentially of
(a) about 75% to 93% by weight of safflower oil bodied to a viscosity of between $Z_1$ and $Z_{10}$,
(b) about 2% to 10% of non-ionic emulsifier soluble both in said oil and in water, and
(c) about 5% to 15% of water
(2) forming from said ingredients an oil-in-water emulsion having an average oil particle size less than two microns, by mixing said ingredients at about room temperature and at very high shear and (3) diluting the resultant mixture with water to bring the water content to about 35%.

20. A method for continuously making an oil-in-water embulsion having very high oil content, comprising feeding to the upper end of a vessel a mixture of (a) about 75% to 93% by weight oil bodied to a viscosity of $Z_1$ to $Z_{10}$ from oil having an iodine value higher than 125, (b) about 2% to 10% by weight non-ionic emulsifier soluble both in said bodied oil and in water, and (c) about 5% to 15% by weight of water, beating the mixture by a beater that rotates at high speed about its own axis while simultaneously being revolved by planetary motion in said vessel to wipe the sides thereof closely at high shear, whereby the mixture is converted into an oil-in-water emulsion with the oil particles averaging less than three microns in diameter, withdrawing the oil-in-water emulsion from the bottom of the vessel, and adding water thereto and mixing to reduce the solids content to about 65%.

21. A method for continuously making an oil-in-water emulsion having very high oil content, comprising feeding to the upper end of a vessel a mixture of (a) about 75% to 93% by weight safflower oil bodied to a viscosity of $Z_1$ to $Z_{10}$, (b) about 2% to 10% by weight non-ionic emulsifier soluble both in said bodied safflower oil and in water, and (c) about 5% to 15% by weight of water, beating the mixture by a beater that rotates at high speed about its own axis while simultaneously being revolved by planetary motion in said vessel to wipe the sides thereof closely at high shear, whereby the mixture is converted into an oil-in-water emulsion with the oil particles averaging less than two microns in diameter, withdrawing the oil-in-water emulsion from the bottom of the vessel, and adding water thereto and mixing to reduce the solids content to about 65%.

22. A method of making a paint vehicle comprising the steps of (1) adding together ingredients consisting essentially of (a) an alkyd having a Gardner-Holdt viscosity of $Z_1$ to $Z_{10}$ made from drying oil with an iodine value of at least 125.

(b) water, and (c) a non-ionic emulsifier soluble in each of the alkyd and the water, said alkyd comprising about 55% to 93% by weight of the total, said emulsifier comprising about 2% to 20% by weight of the total and, water about 5% to 25% by weight thereof, (2) forming from said ingredients an alkyd-in-water emulsion with water as the continuous phase and said alkyd in particles averaging no more than three microns across by mixing at very high shear and in a range from one-tenth to ten microns, and (3) diluting the resultant alkyd-in-water emulsion with water to reduce the alkyd content to a suitable level for paints and to thin the emulsion to desired flow characteristics, and mixing the diluted mixture well.

23. A method for continuously making an alkyd-in-water emulsion having very high alkyd content, comprising feeding to the upper end of a vessel a mixture of (a) about 75% to 93% by weight alkyd having a viscosity of $Z_1$ to $Z_{10}$ made from oil having an iodine value higher than 125, (b) about 2% to 10% by weight non-ionic emulsifier soluble both in said alkyd and in water, and (c) about 5% to 15% by weight of water, beating the mixture by a beater that rotates at high speed about its own axis while simultaneously being revolved by planetary motion in said vessel to wipe the sides thereof closely at high shear, whereby the mixture is converted into an alkyd-in-water emulsion with the alkyd particles averaging less than three microns in diameter, withdrawing the alkyd-in-water emulsion from the bottom of the vessel, and adding water thereto and mixing to reduce the solids content to about 65%.

References Cited by the Examiner

UNITED STATES PATENTS

| | | | |
|---|---|---|---|
| 2,382,533 | 8/1945 | Auer | 106—252 X |
| 2,418,452 | 4/1947 | Auer | 252—312 |
| 2,591,904 | 4/1952 | Zola | 252—312 X |
| 2,978,346 | 4/1961 | Penoyer | 106—252 |
| 3,033,808 | 5/1962 | Murray et al. | 106—252 X |

ALEXANDER H. BRODMERKEL, *Primary Examiner.*

J. B. EVANS, *Assistant Examiner.*